(12) United States Patent
Lepage et al.

(10) Patent No.: US 10,664,747 B2
(45) Date of Patent: May 26, 2020

(54) SELF-ORGANIZED SOLID-STATE SYNTHETIC NEURONAL STRUCTURE

(71) Applicant: Institut National de la Recherche Scientifique (INRS), Quebec (CA)

(72) Inventors: Dominic Lepage, Longueuil (CA); Mohamed Chaker, Montreal (CA)

( * ) Notice: Subject to any disclaimer, the term of this patent is extended or adjusted under 35 U.S.C. 154(b) by 884 days.

(21) Appl. No.: 15/281,174

(22) Filed: Sep. 30, 2016

(65) Prior Publication Data

US 2017/0098155 A1 Apr. 6, 2017

Related U.S. Application Data

(60) Provisional application No. 62/237,633, filed on Oct. 6, 2015.

(51) Int. Cl.
*G06N 3/063* (2006.01)
*G06N 3/04* (2006.01)

(52) U.S. Cl.
CPC ............ *G06N 3/0635* (2013.01); *G06N 3/04* (2013.01); *G06N 3/049* (2013.01)

(58) Field of Classification Search
None
See application file for complete search history.

(56) References Cited

U.S. PATENT DOCUMENTS

| 5,172,204 A | * | 12/1992 | Hartstein | G06N 3/063 |
| | | | | 706/33 |
| 2004/0211994 A1 | * | 10/2004 | Ueda | G11C 27/005 |
| | | | | 257/288 |
| 2014/0124866 A1 | * | 5/2014 | Galy | H01L 29/41775 |
| | | | | 257/368 |

OTHER PUBLICATIONS

G.L. Leahu et al., Semiconductor-metal phase transition of vanadium dioxide nanostructures on silicon substrate: Applications for thermal control of spacecraft, AIP Conference Proceedings 1603, 62 (2014); doi: 10.1063/1.4883043.

* cited by examiner

*Primary Examiner* — Alan Chen
(74) *Attorney, Agent, or Firm* — Benoit & Côté Inc.

(57) ABSTRACT

A synthetic neuronal structure makes use of a semiconductor-metal phase transition material having material regions separated by discontinuities. The discontinuities represent interfaces such that different phases in two adjacent regions result in a metal-semiconductor interface. The interface supports a charge accumulation and a discharge of accumulated charge when an activation energy provided, for example, by electrical current, localized heating or optical energy, reaches a threshold necessary for breakdown of a potential barrier presented by the interface, and thus mimics a leaky integrate-and-fire neuron. With many such interfaces distributed through the structure, the local inputs to a neuron become a weighted sum of energy from neighboring neurons. Thus, different combinations of signals at one or more inputs connected to the structure will favor different neural pathways through the structure, thereby resulting in a neural network.

20 Claims, 8 Drawing Sheets

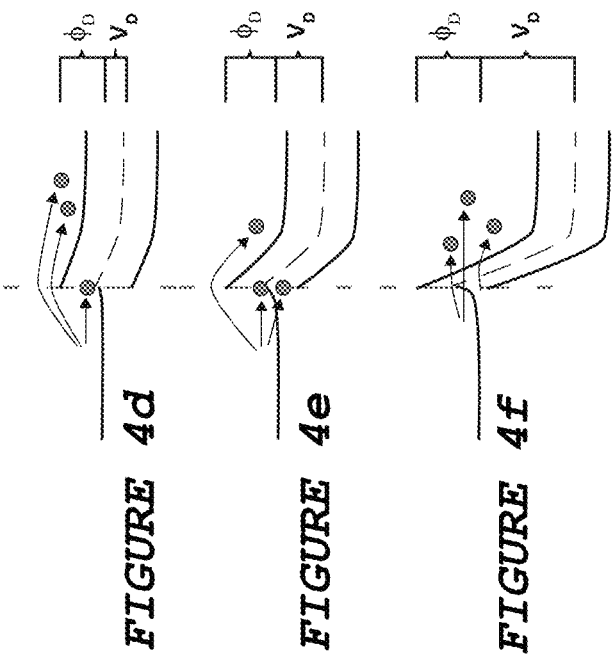
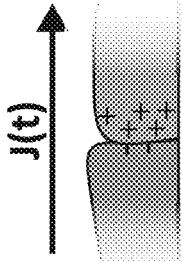
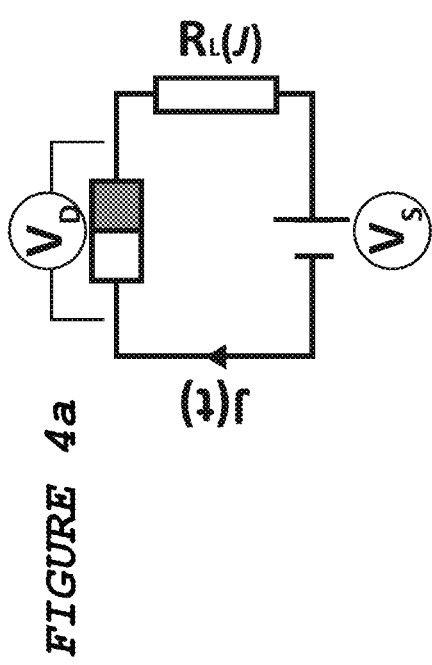
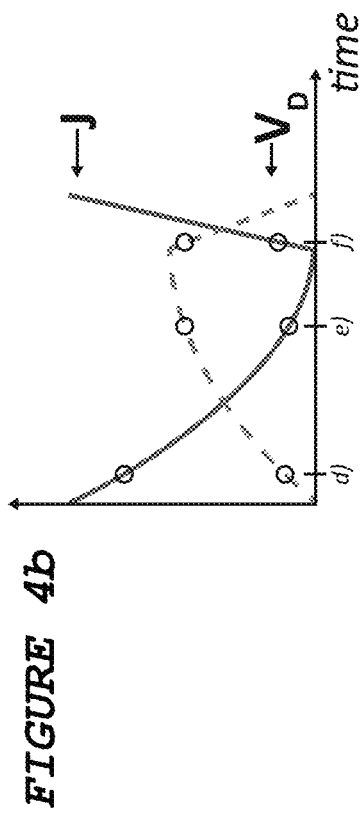
FIGURE 4a
FIGURE 4b
FIGURE 4c
FIGURE 4d
FIGURE 4e
FIGURE 4f

SELF-ORGANIZED SOLID-STATE SYNTHETIC NEURONAL STRUCTURE

BACKGROUND OF THE INVENTION

Field of the Invention

This invention relates generally to the field of nanofabrication and, more specifically, to the construction of synthetic neurons.

Description of the Related Art

Artificial Neural Networks (ANN) are biology-inspired computer systems capable of addressing problems having a large number of unknown inputs. These systems are trained by repetition, with each iteration reinforcing specific neural pathways until an approximately suitable solution can be found. With the growth of computer-assisted decision making, ANN systems are increasingly at the heart of a wide variety of fields including search engines, voice recognition, vehicular/robotic automation and financial trading systems.

The vast majority of existing ANN are software emulations. Commercial state of the art Graphics Processor Units (GPU) now allow for the implementation of deep neural networks for visual recognition. However, in the most powerful type of ANN, Recurrent Neural Networks (RNN), the state of each neuron and connection has to be calculated with respect to other neurons and connections of the system. This updating process therefore creates a system complexity that increases exponentially with an increasing number of neurons. Moreover, since this process must be performed iteratively in software, it limits the potential size and speed of the ANN. Thus, while representing a significant advance in ANN technology, the GPU approach suffers from an inherent limitation in its simulation capabilities.

Another methodology used in the past is the building of a "physical" neural network where physical relationships, as opposed to software algorithms, emulate neuronal processes. This removes the need to iteratively calculate every update in the state of the neurons. By avoiding these calculations, the regression imposed by the learning process becomes a one-step operation, independent of the size of the neural network.

One of the key aspects of much of the prior art is based on the concept of a "memristor". A memristor is a device whose electrical resistance depends on how much electric charge has flowed through it in a given direction in the past. That is, the device effectively remembers its history. Prior to 2007, such a device did not exist in nanoelectronics, but was composed of macroscopic capacitors and variable resistances. In 2007 researchers presented an integrated solid-state $TiO_2$-based memristor in which thin double layers of $TiO_2$ films are encapsulated in metal electrodes. One of the $TiO_2$ layers is depleted of oxygen atoms. With the application of an electric field, oxygen vacancies drift, and thus change the resistance of the layers. In 2014, a solution consisting of $MoO_x/MoS_2$ and $WO_x/WS_2$ heterostructures sandwiched between two printed silver electrodes was demonstrated to be a potential candidate for memristive and memcapacitive switches in printable electronics. Both of these developments provide fast ion conduction at nanoscale and are considered nanoionic devices with great potential in the field of flash memory.

A fundamental concept in ANN is the leaky integrate-and-fire neuron, which is recognized by those knowledgeable in the field to be a formal spiking neuron model. The general operation of this neuron is analogous to its biological counterpart, that is, the neuron integrates many input signals from other neurons in a nonlinear fashion and fires a signal pulse if the sum of the inputs reaches a threshold. This model presents one of the best analogies to biological neurons and can work dynamically (as a function of time) in RNN, where connections between units can form directed cycles (as in the brain).

A three-terminal implementation of a memristor is called a memistor. Such a device is similar to a transistor, where the conductance between two of the terminals is controlled by the third one. However, as opposed to a transistor which operates instantaneously, the memistor integrates the current over time in the third terminal. This adds a dynamic component to the system.

Early physical neural networks include ADALINE in the 1960's, which is a single-layer artificial neural network device implemented using assembled memistor systems. More recent progress has been presented by DARPA SyNAPSE project, which includes an approach based on $TiO_2$ memristor technology as described above.

Another approach to SyNAPSE is to use classical transistors to emulate neural behaviors.

A limitation of current memristors is the requirement of connecting them with other nanodevices to form an artificial neuron. As mentioned above, an activated memristor stays in its current state and has no dynamic responses (thus a good application for flash memory). It serves as an accumulation unit, but cannot intrinsically generate the necessary neuron weightings and is incapable of pulsing a signal output. Therefore, memristors cannot operate as the leaky integrate-and-fire neurons required in dynamic RNN without additional nanocomposites (e.g., integrated capacitances and/or inductances).

A different type of memistor is proposed by U.S. Pat. No. 6,999,953 and is based on phase changing material consisting of In, Ag, Te, Se, Ge, Sb, Bi, Pb, Sn, As, S, P, and mixtures or alloys thereof. The patent claims an analog neuron composed of three modules of phase changing material: a weighting unit, an accumulation unit and an optional activation unit connected in series. As in the case of $TiO_2$ memristor, this device is not dynamic and requires other nanodevices (e.g., capacitances) to build an RNN. The system also presents significant drawbacks over other memistors: various modules are required to produce the memistor effect, and it is made of complex alloys which are both expensive to manufacture and difficult to manipulate. Another problem with these types of composite materials is their very high activation energy, requiring temperatures in excess of 500° K, which are very impractical in micro-nanoelectronics.

More recently, researchers from Pennsylvania State University have proposed using the synchronized charge oscillations in correlated electron systems as a potential candidate for oscillator-based non-Boolean computing. This work involves the electrical connection of two macroscopic vanadium dioxide ($VO_2$) devices coupled through a capacitance. As the scale is macroscopic, however, the density of the devices is inherently limited. Researchers at the Institut National de Research Scientifique (INRS) at Varennes, Quebec are also working with $VO_2$, and have reported the production of optical switches using this material (see, e.g., M. Soltani, et al., 1×2 *optical switch devices based on semiconductor-to-metallic phase transition characteristics of $VO_2$ smart coatings*, Meas. Sci. Technol. 17 (2006) 1052-1056), as well as well as a system for generating a negative capacitance (described in U.S. Patent Application Publication No. 2012/0286743).

SUMMARY OF THE INVENTION

In accordance with the present invention, a synthetic neuronal structure is provided that makes use of a semiconductor-metal phase transition material with different material regions separated by discontinuities. The phase of a given material region is changeable in response to the application of a threshold activation energy. When the material regions separated by a discontinuity are in different phases, a metal-semiconductor interface is formed at the location of the discontinuity.

The metal-semiconductor interface can support a charge accumulation and a discharge of accumulated charge when the activation energy reaches a threshold necessary for breakdown of a potential barrier presented by the interface. The charge accumulation is increased by a flow of electric charges (a current), but eventually limits the current and increases the voltage across the interface. If the activation energy threshold is reached, there is a breakdown of the potential barrier at the interface, and a discharge of accumulated charges occurs. The system is thus reset and the cycle restarted. This embodiment of the invention further comprises at least one input contact by which an input signal may be supplied to at least one of the material regions, and at least one output contact by which an output signal from at least one of the material regions may be detected or forwarded to another system.

The synthetic neuronal structure is such that an activation energy above a predetermined threshold changes the conductivity of the structure by changing the phase of one or more of the material regions. That activation energy may be provided, for example, by a change in electrical current density, a change in temperature or a change in optical energy directed toward the structure. In an exemplary embodiment, the interfaces operate as switchable Schottky barriers, as the respective phase states of adjacent material regions may create a junction that is metal-semiconductor, semiconductor-semiconductor, semiconductor-metal or metal-metal. The conductivity of the structure, depending on the charge integration at the interface, mimics the behavior of a leaky integrate-and-fire neuron.

In an exemplary embodiment, the semiconductor-metal phase transition material comprises vanadium dioxide ($VO_2$). The material may be produced by growing or deposition of the material on a substrate. In such a case, the neuronal structure of the material may be self-assembling, with the nanoscale discontinuities occurring spontaneously during the creation of the material layer to form the different material regions. Input and output contacts are then placed in electrical communication, respectively, with at least one of the material regions.

BRIEF DESCRIPTION OF THE DRAWINGS

FIG. 4a is a circuit diagram modeling a synthetic neuron according to the present invention.

FIG. 4b is a graphical depiction of a signal output from a synthetic neuron according to the present invention.

FIG. 4c is a schematic diagram of an interface in a material structure according to the present invention indicating a relative charge buildup at the interface.

FIGS. 4d-4f are schematic diagrams of three different states of the potential barriers at an interface in a material structure according to the present invention.

DETAILED DESCRIPTION

The present invention makes use of a low activation energy, semiconductor-metal phase transition (PT) material. In the exemplified embodiment of the invention, vanadium dioxide ($VO_2$) is employed as such a PT material. $VO_2$ is a semiconductor with a small energy bandgap at low temperatures which transitions into a metal upon activation. This activation can be induced by photoelectric effects, by direct electrical or potential bias or by temperature. The PT temperature of the material can be tuned and is typically around room temperature (300° K). When current densities are involved, typical values are around 1 $nA/nm^2$ making it a low power and practical solution in micro-nanoelectronics. The response time of the material can range between femtoseconds for activation and picoseconds for relaxation, making it an excellent candidate for fast electronic dynamics.

Figure 1:
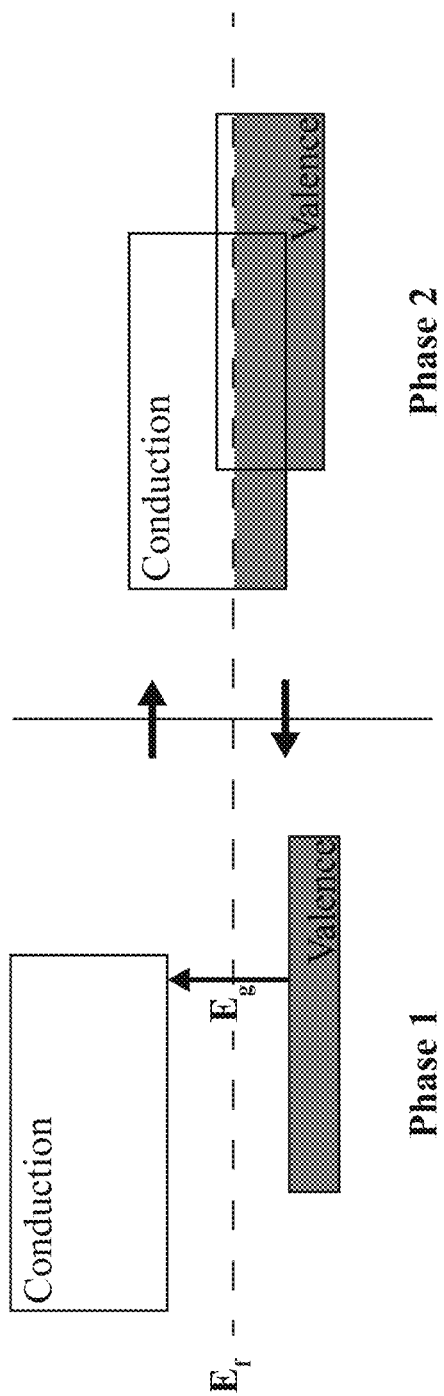
FIG. 1 is an energy diagram showing the two phases of a semiconductor-metal phase transition material used with the present invention.

In an exemplary embodiment of the invention, activation of the PT material is induced by a small electrical current flux, resulting in a collapse of the semiconductor bandgap that renders the material metallic. For the purposes of the present invention, the critical point is that the material energy diagram goes from open to closed upon activation by an external source and is reversible. As shown in FIG. 1, prior to activation the $VO_2$ material has an energy bandgap ($E_g$) between its electronic conduction band and valence band, and thus functions as a semiconductor (indicated as Phase I in the figure). However, with application of the activation energy, the bandgap is closed, the conduction and valence bands overlap and the material is rendered metallic as the electrons can freely conduct (indicated as Phase II in the figure). Other materials having similar properties include chalcogenides, perovskites or other Mott insulators.

In another exemplary embodiment of the invention, activation of the PT material is induced by a small electrical current flux at a voltage which locally induces Joule heating, resulting in a local collapse of the semiconductor bandgap that renders the material metallic. This occurs at a customizable temperature corresponding to any desired local power injection.

Figure 2:
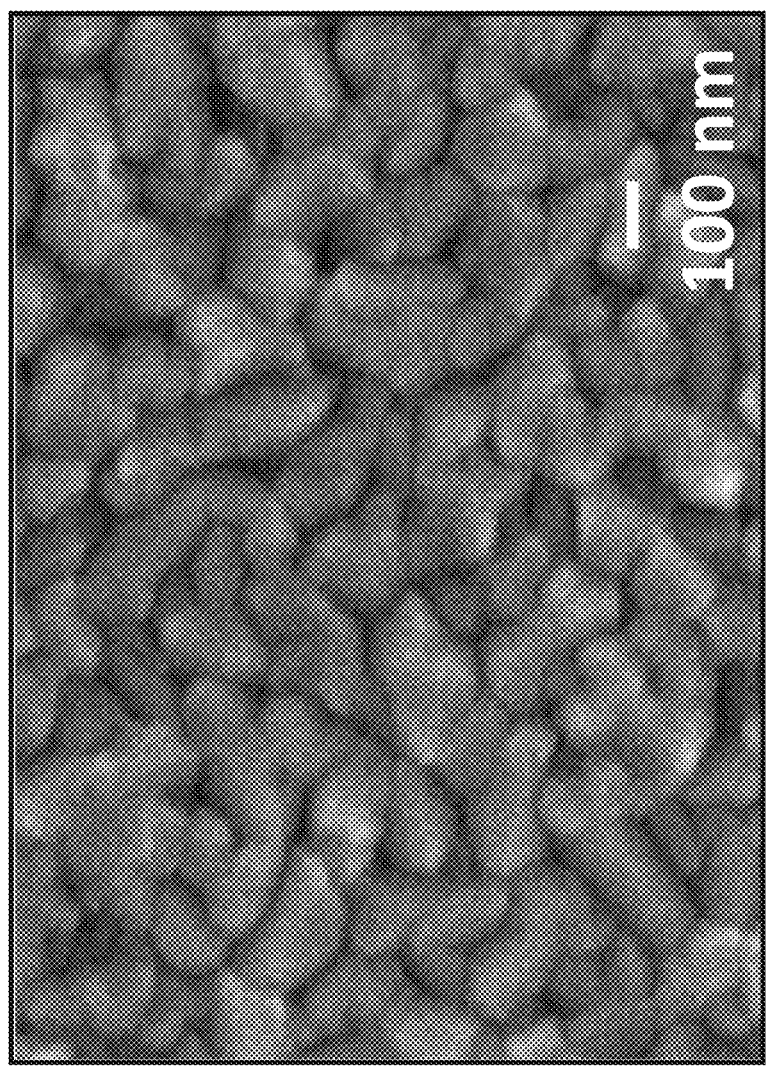
FIG. 2 is a microscopic image of a semiconductor-metal phase transition material structure according to the present invention.

A PT material such as $VO_2$ may be formed such that it has a plurality of material sections with interfaces separating them. These interfaces represent discontinuities in the structure, such as might be found between different regions of a polycrystalline material, but may take a variety of different forms. For example, at the interface between two material sections, defects will naturally be induced if the two sections have different conditions of electronic doping, stress or crystalline orientations. In the present invention, the conditions at the discontinuity allow a synthetic leaky integrate-and-fire neuron to be generated at the interface. The material is typically either grown or deposited by established methods, including pulsed laser deposition, sol-gel or plasma assisted sputtering. The interface defects can be engineered through established nanofabrication methods including doping, lithography, thermal annealing, etc. The defects can also be self-generated during the deposition method itself. In the exemplified embodiment, nanometric grains of $VO_2$ naturally occur in the $VO_2$ deposition in both polycrystalline and epitaxial growth configurations, as illustrated in FIG. 2. The defects at the grain boundaries of those nanocrystals of PT material allows for the storing of interface charges.

Figure 3:
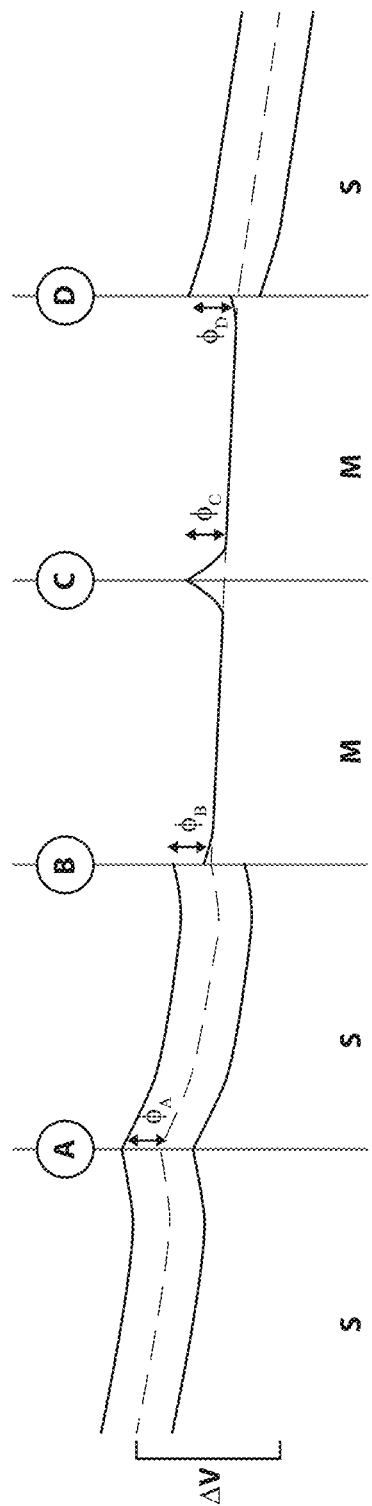
FIG. 3 is an energy diagram showing the different relative phase states at four different types of interface in a material structure according to the present invention.

For a PT material with interface defects as described above, an energy diagram of the material assembly at the interface presents four different possibilities of symmetrical and asymmetrical barriers, as illustrated in FIG. 3. In the figure, four different junction conditions are shown, and are labeled, respectively, A, B, C and D. The state of the material is also indicated to either side of each barrier, with the letter S being used to indicate a material in a semiconductor state, and the letter M being used to indicate a material in a metallic state. Thus, interface A is a semiconductor-semiconductor interface, interface B is a semiconductor-metal interface, interface C is a metal-metal interface, and interface D is a metal-semiconductor interface. To activate the phase transition material, the activation energy may be applied by electrical current, temperature carriers (phonons) or electromagnetic fields (photons). Each of these activation methods serves the same purpose of inducing localized semiconductor-metal phase transitions in the material.

A schematic illustration of the behavior of a single interface is shown in FIGS. 4a-4f. The circuit shown in FIG. 4a represents a model of an interface according to the present invention, such as would be found at the discontinuity between two grains like those shown in FIG. 2, also shown schematically in FIG. 4c. In the FIG. 4a circuit, an external potential $V_S$ is applied to a system consisting of a junction and a load resistivity $R_L$. This load resistivity represents the grains on each side of the junction which have a variable resistivity depending on the PT material and the phase transition state of surrounding grains. If $V_S$ is high enough to induce a current density J passing through the system that is greater than a critical value $J_C$ for one of the grains, the phase state of that grain changes to metallic, and a Schottky junction is created (for example, junction D in FIG. 3).

Referring to FIG. 4d, after the phase change of one of the grains, the junction barrier $\phi_D$ increases in height as charges are stored at the interface, due to the junction capacitance. As shown in FIGS. 4d-4f, surface electron states pin the center of the band gap to the Fermi level. The increase in the barrier height limits the amount of current passing through the system, and the current density, J, decreases. This is illustrated in FIG. 4b, which is a graphical representation of the change in the current density and junction potential with time. Because the potential across the junction is inversely proportional to the current density ($V_D = V_S - J_D \cdot R_L$), $V_D$ increases as the interface is charged. If the stored charges are such that $V_D$ reaches a maximum $V_{Dmax}$ that is above a threshold $V_C$, the electrical field intensity at the interface becomes very large (greater than 1 MV/cm) and the barrier becomes very thin (less than 1 nm). This is the breakdown condition of the junction illustrated in FIG. 4f. As a consequence, the stored charges are rapidly released through ionization and tunneling. This generates a recrudescence of charge flow (i.e. current) and JD increases. $V_D$ decreases accordingly and the initial state of the system is re-established.

If the system is such that $J<J_C$ on both sides of the interface, few charges will be stored (junction A in FIG. 3), as the phase state of the material is semiconductor on both sides of the interface. If the system is such that $J>J_C$ but $V_{Dmax}<V_C$, due to $R_L$, the charges will be stored but not released. In such a case, the interface would be as shown in either junction B or junction D of FIG. 3, but the system would be stable in that state. If $J>J_C$ for both sides of the interface, again, few charges will be stored (junction C in FIG. 3), as $V_{Dmax}<V_C$ due to $R_L$ (metals on both sides) and the current is barely limited by the (small) barrier.

Figure 5:
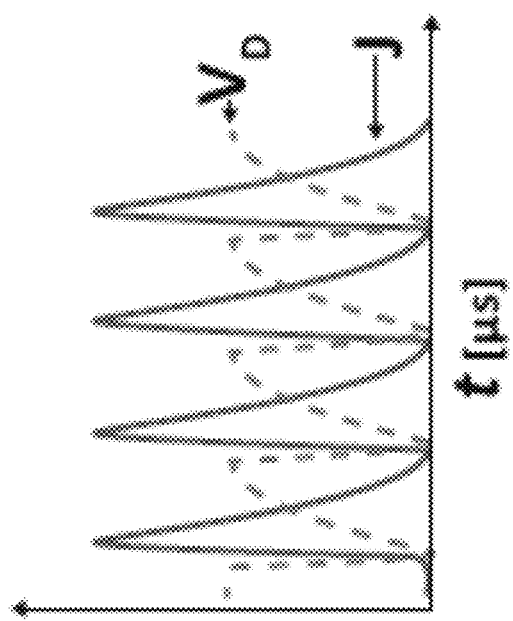
FIG. 5 is a graphical depiction of a pulse train output from a neural structure according to the present invention.

The system response described above and shown in the diagram of FIG. 4b occurs when $J>J_C$ and $V_{Dmax}>V_C$, and the result is a repeating pattern of charge buildup and discharge. This mimics a neuron response, and is manifested by a pulse train as shown in FIG. 5. In this figure, the charge buildup and discharge is represented as a voltage signal $V_D$, shown as a broken line, while the pulsed output current J is shown as a solid line. Those skilled in the art will recognize that this behavior closely simulates that of a biological leaky integrate-and-fire neuron. Those skilled in the art will also notice that junctions B and D are mirror images of each other and that their operation is dependent on the direction of the current flow. In a dynamic network circuit, this means that internal loops can be generated.

Depending on the activation sequence, the interfaces can accumulate charges that result in a capacitance, as illustrated in FIG. 4c. As shown in the figure, a charge buildup (as indicated by a charge depletion region with "+" and "−" symbols) has developed primarily on the semiconductor side of the interface, as surface electron states pin the center of the band gap to the Fermi level, depleting the mobile charge carriers. The resulting capacitance forms a very small depletion region (<10 nm in $VO_2$) at the heart of the neuronal replication.

The interface between two sections of this type of PT material having localized defects provides a system with conditional self-capacitance that therefore behaves as a simple synthetic neuron. If many of such systems are physically connected in a network fashion, the input of a single neuron section will be the weighted sum of a large number of neighbors, for which the weights will depend on the PT states of its local neighbors. If the combination of weighted sum becomes greater than the activation energy flux (such as current density), then there will be a phase change of one of the material sections adjacent to the interface, and the neuron in question will be activated and charges will start to accumulate. If the total number of charges accumulated at the interface is above a threshold, the interface will emit a pulse of energy flux and return to its rest state. This pulse is weighted by all its neighbors and will then, in turn, contribute to the activation/deactivation of other neurons in the neighboring regions of the network. This mode of operation exists regardless of the source of the activation energy. For example, the interface may be activated through local electrical power injection that locally alters the phases of one or many grains through temperature rather than current density.

In the fundamental case, a synthetic neuron consists of a single grain with a capacitive interface. However, multiple grains acting simultaneously would result in the same behavior. In one variation, an additional capacitance could be located outside the grain(s) interface and would provide better control on the charge accumulation process.

Figure 6A:
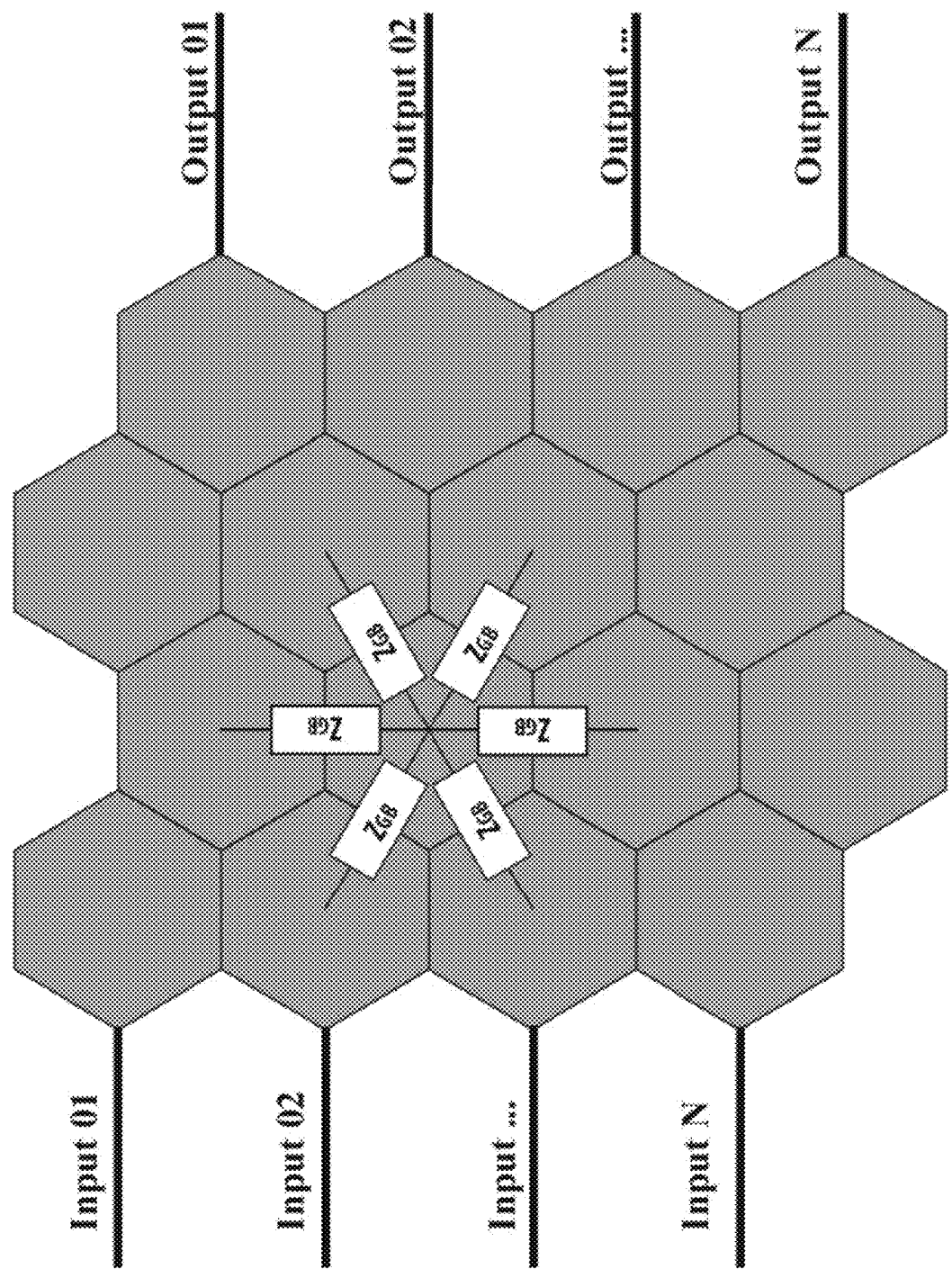
FIG. 6a is a schematic depiction of a two-dimensional neural structure according to the present invention.

In an exemplary embodiment of the invention, the neural network is self-assembling, that is, the formation of sections (grains) and boundary defects occurs spontaneously during formation of the PT material. For example, during the formation of a $VO_2$ structure by one of the aforementioned methods, the material naturally assembles into a collection of grains, the boundaries between which all represent neural interfaces. The grains themselves typically have multiple interfaces with different surrounding grains, as shown in FIG. 2. FIG. 6a is a schematic illustration of such a system of interconnected grains, where each grain forms six neuronal connections. Those skilled in the art will understand that this is a simplified model, based on a statistical evaluation of the number of connections between grains. Moreover, while FIG. 6a shows a series of grains and interfaces in a two-dimensional configuration, materials according to the present invention may have a non-negligible thickness, and may therefore have grain boundaries in three dimensions.

The simplified representation of FIG. 6a shows how the interconnected neurons may be implemented in a practical sense. This arrangement is generally representative of a thin-film of PT formed by evaporation on an insulating surface. Grains on the order of 100 nm are self-assembled and form a network of neurons as described above. The neural interfaces at the boundaries between the grains are represented as a series of complex impedances having the characteristics described above. A series of parallel connectors can be used to contact the network and function as input and outputs, as shown in the figure. This construction would therefore qualify as a deep neural network. Following procedures well established in the field of ANN, the system can then learn, through supervised, reinforced or unsupervised learning, to favor certain pathways. For example, in the schematic diagram of FIG. 6b, a system like that of FIG. 6a is shown with dark shading in regions of the material that form certain pathways that have been reinforced through the learning process, and that could be used for classification. Electronic, photonic, plasmonic or phononic particles would favor these established pathways in future signaling through the structure.

Figure 6B:
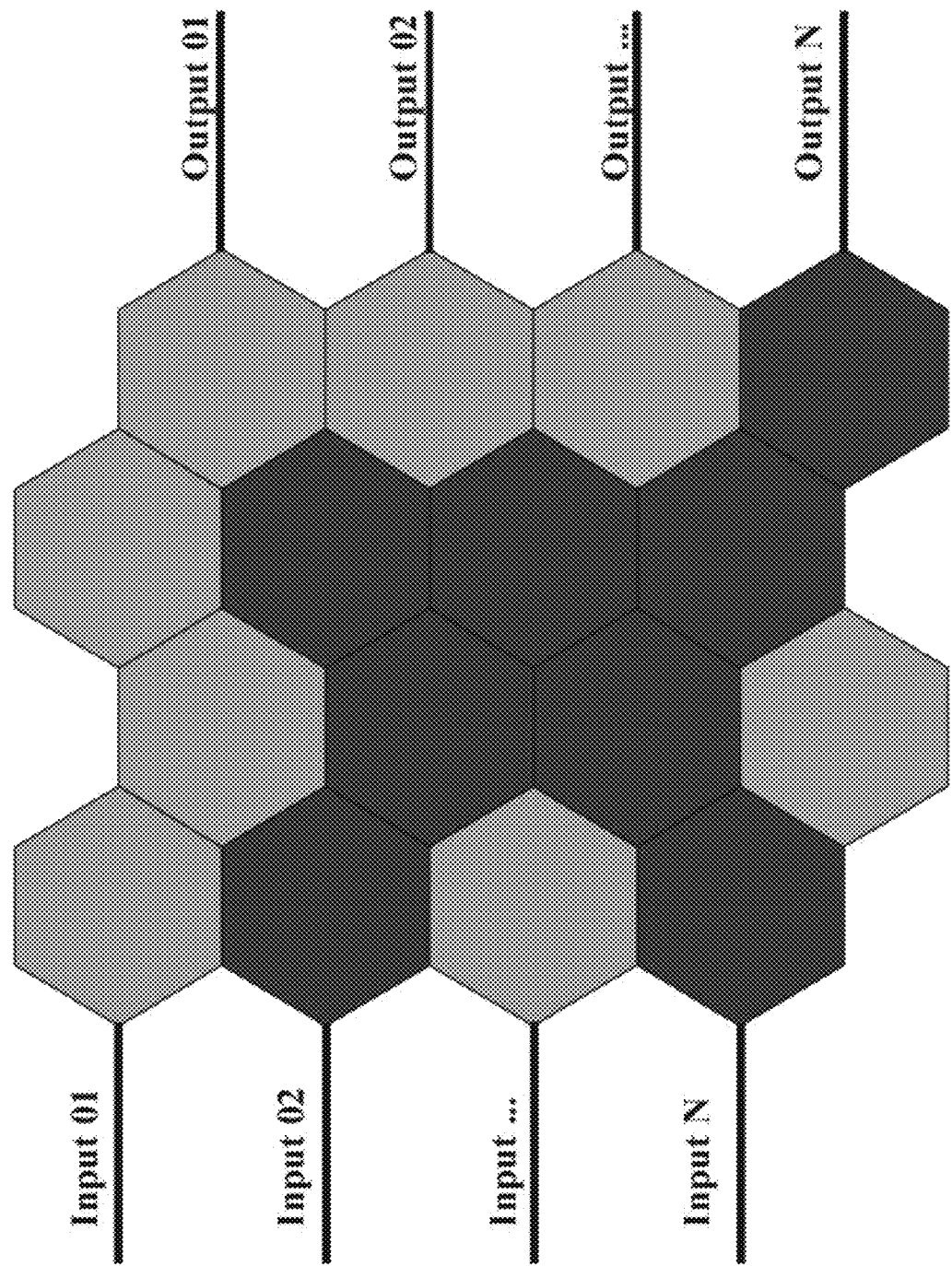
FIG. 6b is a schematic depiction of a neural structure like that of FIG. 5A, but for which a certain neural pathway has been activated.

In another implementation of the invention, inputs and outputs of the system like those shown in FIGS. 6a and 6b may be sequential and time-dependent. In such a system, fast sequences of inputs induce current loops within the networks that can be educated to deliver specific time-dependent outputs. This would be especially adequate since the grains have a relaxation life-time due to the material properties. The software counterparts of such systems are known as very deep neural networks because they consist of many layers of neurons whose states are time-dependent. This implementation makes use of an inner volatile neuronal memory (established charge capacitance) and enables spiking neural computing. This allows very complex dynamics at a very low power cost. Such a system tends to mimic the human brain in its manner of operation.

Figure 6C:
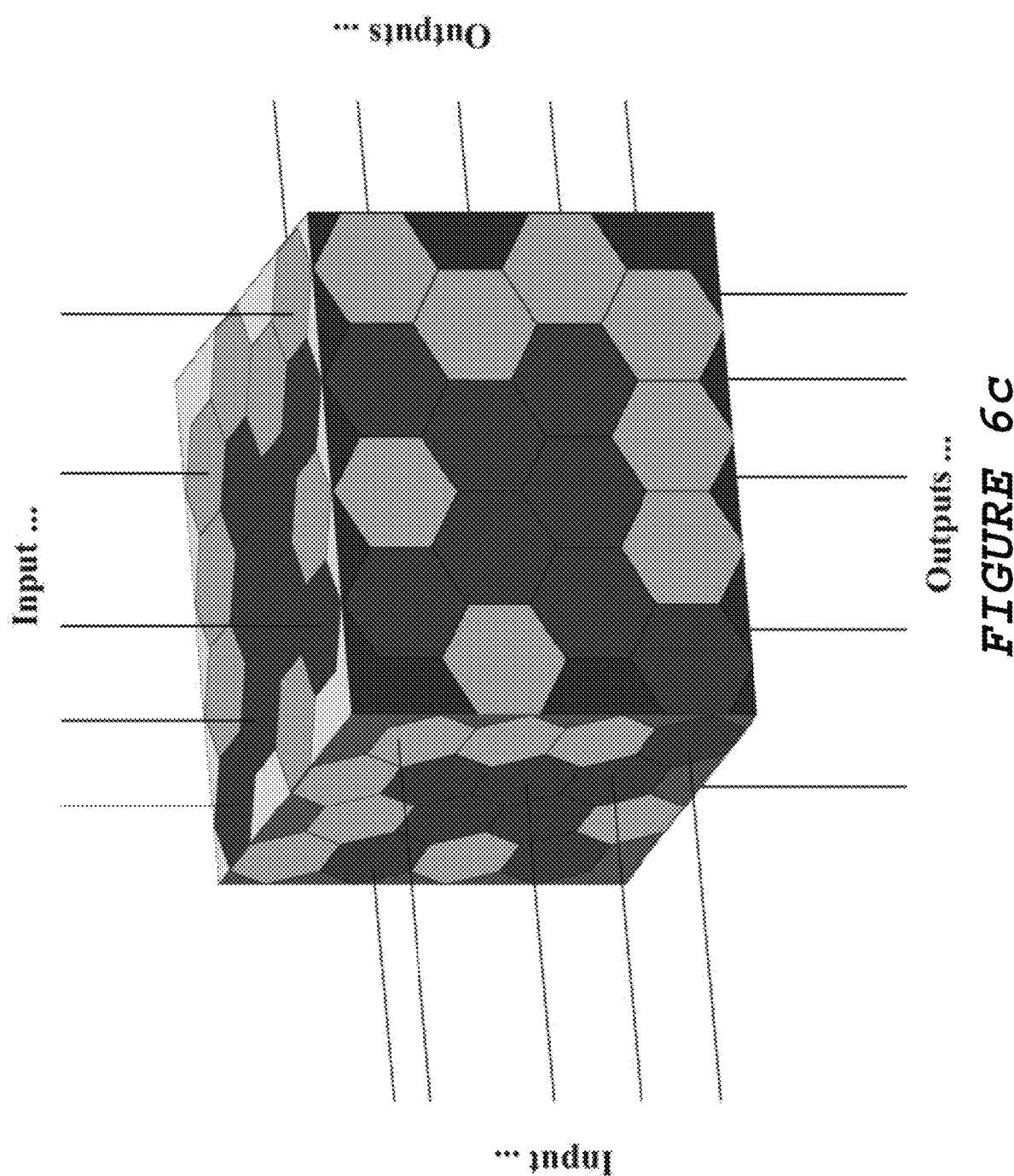
FIG. 6c is a schematic depiction of a three-dimensional neural structure according to the present invention.

As mentioned above, it is anticipated that the invention may be constructed to have grain boundaries in three dimensions. Producing thicker layers of PT materials would result in more grain interfaces and input/output connections distributed in various locations within the 3D neural network. As in the two-dimensional model, operations could be quasi-static (such that the synthetic ANN geometry is first established, and then used as-is with slow time-varying inputs/outputs) or spike-based and sequential (such that the synthetic ANN geometry is dynamically reacting to time-varying input/output signals, with internal time-dependent loops). FIG. 6c is a schematic representation of such a three-dimensional neural network, showing various inputs and outputs at different positions along the exterior of the structure.

As mentioned above, classical non-volatile memristors based on $TiO_2$ (which is not a phase-changing material) have a very different functioning method than the present invention. In those types, a conduction canal is developed by the application of a high electric field, forcing oxygen to migrate and permanently modify the conductivity of the device. Although this process can be relatively fast, it is an ionic process which geometrically changes the nature of the connection. Because the change is permanent, it is an otherwise static device with no dynamic responses. The application of such structures are best suited for flash memory and is outside the scope of the present invention.

Recent discoveries in the field of dynamic neuromorphic systems indicate that volatile memory units are more adequate for handling fluctuating fast spiking information. In this field, some authors have developed a synthetic neuron (neuristor) based on a circuit of resistors, capacitance and volatile memristor. The critical element of this neuristor is located within the memristor consisting of $NbO_2$ (phase-changing material) sandwiched between two wires of platinum. Simply replacing the material with $VO_2$ would significantly lower the activation energy involved and facilitate the fabrication. However, there is a fundamental difference between this cross-hatched architecture and the structure disclosed herein in that there is no self-assembly of neuristors in the case of the $NbO_2$ prior art. It is well known to those in the field that neuronal interconnectivity plays a critical role in the analytical computing power of a neural network. For this reason, the fabrication of a hardware neural network based on a 2D cross-hatched wire structure will never reach biological-level neuronal densities. In contrast with the prior art, the invention presented herein is not limited to the 2D plane of a substrate wafer and assembles "organically". To reach full potential, this synthetic neuronal structure can be self-assembled and stack interconnectivities in 3D.

While the invention has been shown and described with reference to a preferred embodiment thereof, it will be recognized by those skilled in the art that various changes in form in detail may be made herein without departing from the spirit and scope of the invention as defined by the amended claims.

The invention claimed is:

1. A synthetic neuronal structure comprising:
   a semiconductor-metal phase transition material with different material regions separated by discontinuities, such that different physical material phases in the structure of either side of a discontinuity result in a metal-semiconductor interface, the phase of a material region being changeable in response to the application of a threshold activation energy;
   at least one input contact by which an input signal may be supplied to at least one of said material regions; and
   at least one output contact by which an output signal from at least one of said material regions may be detected;
   wherein said metal-semiconductor interface supports a charge accumulation and a discharge of accumulated charge when the activation energy reaches a threshold necessary for breakdown of a potential barrier presented by the interface.

2. A synthetic neuronal structure according to claim 1 wherein an activation energy that changes the phase of one or more grains of the structure is provided by a change in electrical current density.

3. A synthetic neuronal structure according to claim 1 wherein an activation energy that changes the phase of one or more grains of the structure is provided by a change in temperature.

4. A synthetic neuronal structure according to claim 1 wherein an activation energy that changes the phase of one or more grains of the structure is provided by optical energy directed toward the structure.

5. A synthetic neuronal structure according to claim 1 wherein the metal-semiconductor interface operates as a switchable Schottky barrier.

6. A synthetic neuronal structure according to claim 1 wherein the phase transition material comprises vanadium dioxide.

7. A synthetic neuronal structure according to claim 1 wherein each of the interfaces functions as a synthetic leaky integrate-and-fire neuron.

8. A synthetic neuronal structure according to claim 1 wherein the material regions and discontinuities are self-assembled in a fabrication process.

9. A synthetic neuron comprising:
a semiconductor-metal phase transition material capable of having different physical material phases, respectively, in a first material region and a second material region separated by a discontinuity, the physical material phase of the first material region being changeable in response to the application of a threshold activation energy, the material being such that when the first region is in a metallic phase and the second region is in a semiconductor phase the discontinuity forms a metal-semiconductor interface that supports a charge accumulation and a discharge of accumulated charge when the activation energy reaches a threshold necessary for breakdown of a potential barrier presented by the interface; and
electrical contacts connected to the first and second regions by which electrical signals may be applied to, and received from, the material.

10. A synthetic neuron according to claim 9 wherein the threshold activation energy is provided by a change in electrical current density.

11. A synthetic neuron according to claim 9 wherein the threshold activation energy is provided by a change in temperature.

12. A synthetic neuron according to claim 9 wherein the threshold activation energy is provided by optical energy directed toward the material.

13. A synthetic neuron according to claim 9 wherein the metal-semiconductor interface operates as a switchable Schottky barrier.

14. A synthetic neuron according to claim 9 wherein the phase transition material comprises vanadium dioxide.

15. A synthetic neuron according to claim 9 wherein the neuron operates as a leaky integrate-and-fire neuron.

16. A method of constructing a synthetic neuronal structure comprising:
forming a semiconductor-metal phase transition material into a structure having a plurality of different material regions separated by discontinuities, such that different physical material phases in the structure of either side of a discontinuity result in a metal-semiconductor interface, the phase of a material region being changeable in response to the application of a threshold activation energy;
providing an input contact in electrical communication with at least one of said material regions; and
providing an output contact in electrical communication with at least one of said material regions;
wherein said metal-semiconductor interface supports a charge accumulation and a discharge of accumulated charge when the activation energy reaches a threshold necessary for breakdown of a potential barrier presented by the interface.

17. A method according to claim 16 wherein the material regions and discontinuities are self-assembled when forming the material.

18. A method according to claim 16 further comprising deposition of the material on a substrate.

19. A method according to claim 16 further comprising generating the discontinuities using methods including at least one of doping, lithography and thermal annealing.

20. A method according to claim 16 wherein the phase transition material comprises vanadium dioxide.

* * * * *